(12) United States Patent
Su et al.

(10) Patent No.: US 8,639,061 B2
(45) Date of Patent: Jan. 28, 2014

(54) IMAGE ADJUSTING CIRCUIT AND IMAGE ADJUSTING METHOD

(75) Inventors: Wei-Chi Su, Tainan (TW); Chih-Chia Kuo, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 190 days.

(21) Appl. No.: 13/184,575

(22) Filed: Jul. 18, 2011

(65) Prior Publication Data

US 2012/0140116 A1 Jun. 7, 2012

(30) Foreign Application Priority Data

Dec. 7, 2010 (TW) ................................ 99142589 A

(51) Int. Cl.
*G06K 9/32* (2006.01)
(52) U.S. Cl.
USPC .......... 382/299; 345/660; 348/607; 358/3.26; 358/3.28; 375/240.11; 382/232; 708/313
(58) Field of Classification Search
None
See application file for complete search history.

(56) References Cited

U.S. PATENT DOCUMENTS

| 6,125,143 A * | 9/2000 | Suzuki et al. ............ 375/240.11 |
| 6,252,989 B1 * | 6/2001 | Geisler et al. ................. 382/232 |
| 6,411,305 B1 * | 6/2002 | Chui ............................. 345/660 |
| 2002/0097439 A1 * | 7/2002 | Braica .......................... 358/3.26 |
| 2006/0013304 A1 * | 1/2006 | Maeda et al. ............ 375/240.11 |
| 2006/0077470 A1 * | 4/2006 | Saquib .......................... 358/3.28 |
| 2008/0218635 A1 * | 9/2008 | Tsuruoka ...................... 348/607 |
| 2010/0146026 A1 * | 6/2010 | Christoph ..................... 708/313 |

FOREIGN PATENT DOCUMENTS

| TW | 201030632 | 8/2010 |
| TW | 201043014 | 12/2010 |

OTHER PUBLICATIONS

"Office Action of Taiwan counterpart application" issued on May 22, 2013, p. 1-p. 5, in which the listed references were cited.

* cited by examiner

*Primary Examiner* — Tsung-Yin Tsai
(74) *Attorney, Agent, or Firm* — Jiang Chyun IP Office

(57) ABSTRACT

An image adjusting method is adapted to an image adjusting circuit. The image adjusting method includes following steps. An image signal is received and up-sampled to generate a first up-sampled image signal and a second up-sampled image signal. The first up-sampled image signal includes interpolated pixels and original pixels. Values of the interpolated pixels and the original pixels are detected, and a weight value is outputted according to the detection result. Whether the values of the interpolated pixels are adjusted or not is determined based on the detection result. According to the weight value, the second up-sampled image signal and the adjusted first up-sampled image signal are mixed to output a mixed image signal. An image adjusting circuit is also provided.

18 Claims, 3 Drawing Sheets

○ original pixel
◎ interpolated pixel

| pixel | P2 | I2 | P3 | I3 | P4 | I4 | P5 | I5 | P6 | I6 | P7 |
|---|---|---|---|---|---|---|---|---|---|---|---|
| image signal S1 | 50 | | 50 | | 50 | | 200 | | 200 | | 200 |
| image signal S2 | 50 | 70 | 50 | 0 | 50 | 125 | 200 | 250 | 200 | 180 | 200 |
| upper limit | | 50+10 | | 200+10 | | 200+10 | | 200+10 | | 200+10 | |
| lower limit | | 50−10 | | 50−10 | | 50−10 | | 50−10 | | 200−10 | |
| image signal S2' | 50 | 60 | 50 | 40 | 50 | 125 | 200 | 210 | 200 | 190 | 200 |

IMAGE ADJUSTING CIRCUIT AND IMAGE ADJUSTING METHOD

CROSS-REFERENCE TO RELATED APPLICATION

This application claims the priority benefit of Taiwan application serial no. 99142589, filed on Dec. 7, 2010. The entirety of the above-mentioned patent application is hereby incorporated by reference herein and made a part of this specification.

BACKGROUND OF THE INVENTION

1. Field of the Invention

The invention relates in general to an adjusting circuit and an adjusting method and in particular to an image adjusting circuit and an image adjusting method.

2. Description of Related Art

In recent years, computation power of computers increases at a rapid pace, and digital media have become one of the major instruments for demonstrating creativity and imagination. With advancement of digital image processing and imaging products, images of various types can be recorded and stored in digital format. There are a number of different digital imaging products including thin film transistor liquid crystal displays (TFT-LCD), digital still cameras, digital video camcorders, digital televisions, and so forth. The quality of ultimately output images relies on the front-end image-capturing devices, the digital image processors, the back-end digital image output devices, etc.

After an image has been digitally processed, the image is output from the back-end equipment of a digital imaging apparatus in form of an image or a document. According to digital image processing (DIP) principles, analog images are "digitized" before the two-dimensional or the three-dimensional images are processed by computers. The method includes "sampling" an image on all locations and then analyzing and recording the brightness, the color, and the location of each point of the image. Each sampling point of the image is referred to as a pixel, and a set of pixels together forms the image. The image data related to each pixel include its gray scale value, color, and brightness, and the image data are stored as data arrays into computers for further processing. The image data are then digitally processed and transmitted to an image output device in form of digital image signals.

After the image output device receives the digital image signals, the image data are up-sampled. If a low order filter is adopted in the image output device to up-sample the image data, data at high frequency in the digital image signals are blurred. By contrast, when a high order filter is utilized for up-sampling the image data, the data at high frequency in the digital image signals can be retained. However, with use of the high order filter for up-sampling the image data, unacceptable visual effects such as light contour are apt to be generated at sharp edges of the image, and ripples are likely to be formed due to ringing effects or ripple effects. As such, the quality of the ultimately output images is deteriorated.

SUMMARY OF THE INVENTION

The invention is directed to an image adjusting circuit capable of removing light contour generated at sharp edges of an image when the image is being up-sampled and eliminating ripples caused by ringing effects or ripple effects.

The invention is directed to an image adjusting method capable of removing light contour generated at sharp edges of an image when the image is being up-sampled and eliminating ripples caused by ringing effects or ripple effects.

The invention provides an image adjusting circuit including an up-sampling unit, a signal detecting unit, a signal correcting unit, and a signal mixing unit. The up-sampling unit receives and up-samples an image signal to generate a first up-sampled image signal and a second up-sampled image signal, and the first up-sampled image signal includes at least one interpolated pixel and at least one original pixel. The signal detecting unit detects a value of the interpolated pixel and a value of the original pixel and outputs a weight value based on a detection result of the signal detecting unit. The signal correcting unit determines whether the value of the interpolated pixel is adjusted or not based on the detection result of the signal detecting unit. The signal mixing unit mixes the second up-sampled image signal and an adjusted first up-sampled image signal based on the weight value to output a mixed image signal.

According to an embodiment of the invention, the signal correcting unit limits the value of the interpolated pixel to be within a tolerance range based on the detection result of the signal detecting unit, and the tolerance range includes an upper limit and a lower limit.

According to an embodiment of the invention, the first up-sampled image signal includes a first original pixel and a second original pixel. The signal correcting unit respectively determines the upper limit and the lower limit of the tolerance range based on a value of the first original pixel and a value of the second original pixel.

According to an embodiment of the invention, the signal correcting unit determines a standard upper limit based on the value of the first original pixel, and the upper limit of the tolerance range is the sum of the standard upper limit and a tolerance value. The signal correcting unit also determines a standard lower limit based on the value of the second original pixel, and the lower limit of the tolerance range is the difference between the standard lower limit and the tolerance value.

According to an embodiment of the invention, the signal correcting unit limits the value of the interpolated pixel to be within the tolerance range based on the detection result of the signal detecting unit if the interpolated pixel is an overshoot pixel.

According to an embodiment of the invention, the signal correcting unit limits the value of the interpolated pixel to be within the tolerance range based on the detection result of the signal detecting unit if the interpolated pixel is an artifact pixel.

According to an embodiment of the invention, the signal correcting unit, based on the detection result of the signal detecting unit, does not adjust the value of the interpolated pixel if the interpolated pixel is a transition pixel.

According to an embodiment of the invention, the up-sampling unit up-samples the image signal to double an image corresponding to the image signal.

According to an embodiment of the invention, the image adjusting circuit further includes a re-sampling unit. The re-sampling unit re-samples the mixed image signal to multiply an image corresponding to the image signal to a predetermined degree.

According to an embodiment of the invention, the value of the interpolated pixel and the value of the original pixel are gray scale values, color values, or luminance values of the image signal.

According to an embodiment of the invention, the up-sampling unit includes a high order filtering unit and a low order filtering unit. The high order filtering unit receives and up-samples the image signal to generate the first up-sampled image signal. The low order filtering unit receives and up-samples the image signal to generate the second up-sampled image signal.

The invention provides an image adjusting method adapted to an image adjusting circuit. The image adjusting method includes following steps. An image signal is received and up-sampled to generate a first up-sampled image signal and a second up-sampled image signal. The first up-sampled image signal includes at least one interpolated pixel and at least one original pixel. A value of the interpolated pixel and a value of the original pixel are detected, and a weight value is outputted based on a detection result. Whether the value of the interpolated pixel is adjusted or not is determined based on the detection result of a signal detecting unit. According to the weight value, the second up-sampled image signal and an adjusted first up-sampled image signal are mixed to output a mixed image signal.

According to an embodiment of the invention, in the step of adjusting the value of the interpolated pixel, the value of the interpolated pixel is limited to be within a tolerance range based on the detection result of the signal detecting unit, and the tolerance range includes an upper limit and a lower limit.

According to an embodiment of the invention, the first up-sampled image signal includes a first original pixel and a second original pixel. In the step of adjusting the value of the interpolated pixel, the upper limit and the lower limit of the tolerance range are respectively determined based on a value of the first original pixel and a value of the second original pixel.

According to an embodiment of the invention, in the step of determining the upper limit and the lower limit of the tolerance range, a standard upper limit is determined based on the value of the first original pixel, and a standard lower limit is determined based on the value of the second original pixel. Here, the upper limit of the tolerance range is the sum of the standard upper limit and a tolerance value, and the lower limit of the tolerance range is the difference between the standard lower limit and the tolerance value.

According to an embodiment of the invention, in the step of adjusting the value of the interpolated pixel, the value of the interpolated pixel, based on the detection result of the signal detection unit, is limited to be within the tolerance range if the interpolated pixel is an overshoot pixel.

According to an embodiment of the invention, in the step of adjusting the value of the interpolated pixel, the value of the interpolated pixel, based on the detection result of the signal detection unit, is limited to be within the tolerance range if the interpolated pixel is an artifact pixel.

According to an embodiment of the invention, in the step of adjusting the value of the interpolated pixel, the value of the interpolated pixel, based on the detection result of the signal detection unit, is not adjusted if the interpolated pixel is a transition pixel.

According to an embodiment of the invention, in the step of up-sampling the image signal, the image signal is up-sampled to double an image corresponding to the image signal.

According to an embodiment of the invention, the image adjusting method further includes re-sampling the mixed image signal to multiply an image corresponding to the image signal to a predetermined degree.

According to an embodiment of the invention, the value of the interpolated pixel and the value of the original pixel are gray scale values, color values, or luminance values of the image signal.

Based on the above, in the image adjusting circuit and the image adjusting method as described in the embodiments of the invention, the pixels of the up-sampled image signal can be detected, and the interpolated pixel exceeding the tolerance range can be limited and adjusted based on the detection result of the signal detecting unit, so as to remove the light contour generated at the sharp edges of an image when the image is being up-sampled and eliminate the ripples caused by the ringing effects or the ripple effects.

It is to be understood that both the foregoing general descriptions and the following detailed embodiments are exemplary and are, together with the accompanying drawings, intended to provide further explanation of technical features and advantages of the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the exemplary embodiments of the invention, the image adjusting circuit and the image adjusting method are applicable to effectively detect locations of light contour and ripples with low costs when the image signal is up-sampled by two. Further, the up-sampling result is limited, such that the interpolated pixel is restricted to be around the adjacent original pixels, which should however not be construed as a limitation to the invention. Thereby, the quality of the output image can be improved. If the image signal is not up-sampled by two, it is likely to first up-sample the image signal by $2^n$ (n is a positive integer other than one) and then reduce the up-sampled signal to a predetermined degree.

Figure 1:
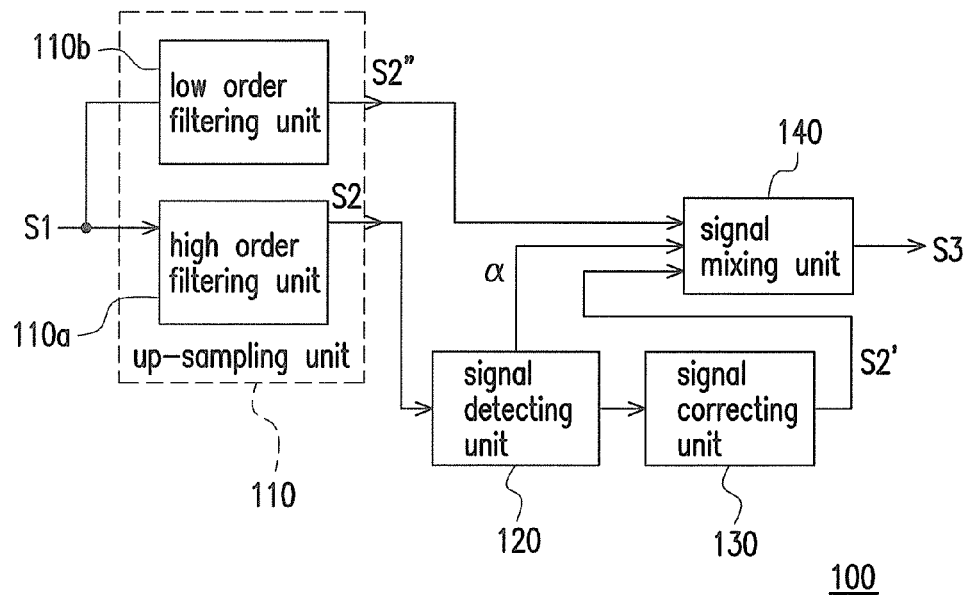
FIG. 1 illustrates an image adjusting circuit according to an embodiment of the invention.

FIG. 1 illustrates an image adjusting circuit according to an embodiment of the invention. As shown in FIG. 1, in this embodiment, an image adjusting circuit 100 includes an up-sampling unit 110, a signal detecting unit 120, a signal correcting unit 130, and a signal mixing unit 140. The up-sampling unit 110 receives an image signal S1 transmitted by a previous image processing circuit (not shown) and up-samples the image signal S1 to output a first up-sampled image signal S2 and a second up-sampled image signal S2".

In this embodiment, the up-sampling unit 110 includes a high order filtering unit 110a and a low order filtering unit 110b. The high order filtering unit 110a receives and up-samples the image signal S1 to generate the first up-sampled image signal S2. The low order filtering unit 110b receives and up-samples the image signal S1 to generate the second up-sampled image signal S2". Here, the low order filtering unit 110b is a bi-linear filter, for instance, and the second up-sampled image signal S2" is generated by the bi-linear filter.

Figure 2:
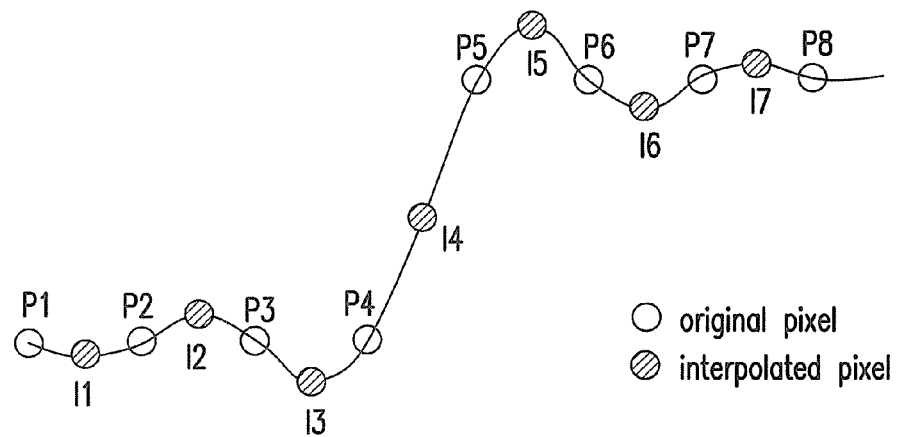
FIG. 2 illustrates an up-sampled image signal according to an embodiment of the invention.

FIG. 2 illustrates the first up-sampled image signal S2 according to an embodiment of the invention. With reference to FIG. 1 and FIG. 2, in this embodiment, the first up-sampled image signal S2, for instance, includes interpolated pixels I1~I7 and original pixels P1~P8.

The signal detecting unit 120, after receiving the first up-sampled image signal S2, detects a value of each pixel of the first up-sampled image signal S2 and outputs a weight value α to the signal mixing unit 140 based on the detection result. The signal correcting unit 130 determines whether the values of the interpolated pixels I1~I7 are adjusted or not based on the detection result of the signal detecting unit 120. The signal mixing unit 140 then mixes the value of each pixel in the second up-sampled image signal S2" and an adjusted first up-sampled image signal S2' based on the weight value α and outputs the mixed image signal S3 to a following image processing circuit (not shown).

To be more specific, in this embodiment, the signal detecting unit 120, for example, determines the pixels in the first up-sampled image signal S2 to be artifact pixels, overshoot pixels, or transition pixels based on the following condition (1) and condition (2) and outputs the weight value α to the signal mixing unit 140 based on the detection result.

The interpolated pixels I1~I3 and the original pixels P1~P4 are taken for example. When the signal detecting unit 120 selects the interpolated pixel I2 for detection and the following condition (1) is satisfied, the signal detecting unit 120 determines the interpolated pixel I2 to be the artifact pixel.

$$hf1=(i1>p1\&\&i1>p2)\|(i1<p1\&\&i1<p2);$$

$$hf2=(i2>p2\&\&i2>p3)\|(i2<p2\&\&i2<p3);$$

$$hf3=(i3>p3\&\&i3>p4)\|(i3<p3\&\&i3<p4); \quad \text{Condition (1)}$$

In case of (hf1 && hf2 && hf3), the interpolated pixel I2 is determined to be the artifact pixel.

Here, i1~i3 are values of the interpolated pixels I1~I3, and p1~p4 are values of the original pixels P1~P4.

(i1>p1 && i1>p2) in the determination equation hf1 indicates the value i1 of the interpolated pixel I1 is greater than individual values p1 and p2 of the original pixels P1 and P2 adjacent to the interpolated pixel I1, and the interpolated pixel I1 and the original pixels P1 and P2 have a combing configuration. (i1<p1 && i1<p2) in the determination equation hf1 indicates the value i1 of the interpolated pixel I1 is less than individual values p1 and p2 of the original pixels P1 and P2 adjacent to the interpolated pixel I1, and the interpolated pixel I1 and the original pixels P1 and P2 have a combing configuration as well.

Hence, in the determination equation hf1, as long as the interpolated pixel I1 and the original pixels P1 and P2 adjacent to the interpolated pixel I1 have the combing configuration, the signal detecting unit 120 determines the determination equation hf1 is satisfied no matter the combing configuration satisfies (i1>p1 && i1>p2) or (i1<p1 && i1<p2). That is to say, the symbol "∥" in the determination equation hf1 denotes the logical "OR", and the symbol "&&" denotes the logical "AND".

Likewise, in the determination equation hf2, as long as the interpolated pixel I2 and the original pixels adjacent thereto have the combing configuration, the signal detecting unit 120 determines the determination equation hf2 is satisfied no matter the combing configuration satisfies (i2>p2 && i2>p3) or (i2<p2 && i2<p3).

In the determination equation hf3, as long as the interpolated pixel I3 and the original pixels adjacent thereto have the combing configuration, the signal detecting unit 120 determines the determination equation hf3 is satisfied no matter the combing configuration satisfies (i3>p3 && i3>p4) or (i3<p3 && i3<p4).

Accordingly, if the signal detecting unit 120 determines the determination equations hf1, hf2, and hf3 are all satisfied, then the signal detecting unit 120 determines the interpolated pixel I2 to be an artifact pixel. The signal correcting unit 130 then adjusts the value of the interpolated pixel I2. For instance, the signal correcting unit 130 limits the value of the interpolated pixel I2 to be within a tolerance range.

On the other hand, the interpolated pixels I3 and I4 and the original pixels P1~P8 are taken for example. When the signal detecting unit 120 selects the interpolated pixels I3 and I4 for detection and the following condition (2) is satisfied, the signal detecting unit 120 determines the interpolated pixel I4 to be the transition pixel and the interpolated pixel I3 to be the overshoot pixel.

$$ST2=[p5-p4]/2$$

$$ST4=[(p5+p6)-(p3+p4)]/4$$

$$ST8=[(p5+p6+p7+p8)-(p1+p2+p3+p4)]/8$$

$$HP4=[(p4+p5)-(p3+p6)]/4$$

$$\text{Diff\_st}=\max(0,\max(|ST4|,|ST8|)-\max(|ST2|,|ST4|/2)) \quad \text{Condition (2)}$$

Here, p1~p8 are values of the original pixels P1~P8. ST2 denotes ½ of the difference between the values p4 and p5. ST4 denotes ¼ of the difference between the sum of the values p5 and p6 and the sum of the values p3 and p4. ST8 denotes ⅛ of the difference between the sum of the values p5, p6, p7, and p8 and the sum of the values p1, p2, p3, and p4. HP4 denotes ¼ of the difference between the sum of the values p4 and p5 and the sum of the values p3 and p6.

The determination value Diff_st denotes the difference between the greater one of the absolute values |ST4| and |ST8| and the greater one of the absolute values |ST2| and |HP4|/2, and the determination value Diff_st is than compared with zero. It should be mentioned that the absolute value |HP4|/2 is exemplary and should not be construed as a limitation to the invention. In other embodiments of the invention, the absolute value |HP4| can be divided by a proper value based on actual requirements.

Hence, if the signal detecting unit 120 determines Diff_st>0, the signal detecting unit 120 determines the interpolated pixel I3 to be the overshoot pixel. The signal correcting unit 130 then limits the value of the interpolated pixel I3 to be within a tolerance range.

By contrast, if the signal detecting unit 120 determines Diff_st=0, the signal detecting unit 120 determines the interpolated pixel I4 to be the transition pixel, and it is not necessary for the signal correcting unit 130 to adjust the value of the interpolated pixel I4.

In this embodiment, the signal detecting unit 120 can, based on the conditions (1) and (2), determine each of the interpolated pixels in the first up-sampled image signal S2 to be the artifact pixel, the overshoot pixel, or the transition pixel. If the conditions (1) and (2) are not satisfied after the signal detecting unit 120 detects the pixels in the first up-sampled image signal S2, the detected pixels are defined as the interpolated pixels in no need of adjustment and limitation or defined as the original pixels.

Based on the detection result, the signal detecting unit 120 outputs the weight value α to the signal mixing unit 140, such that the signal mixing unit 140 mixes the second up-sampled image signal S2" and the adjusted first up-sampled image signal ST based on the weight value α.

Figures 3, 4:
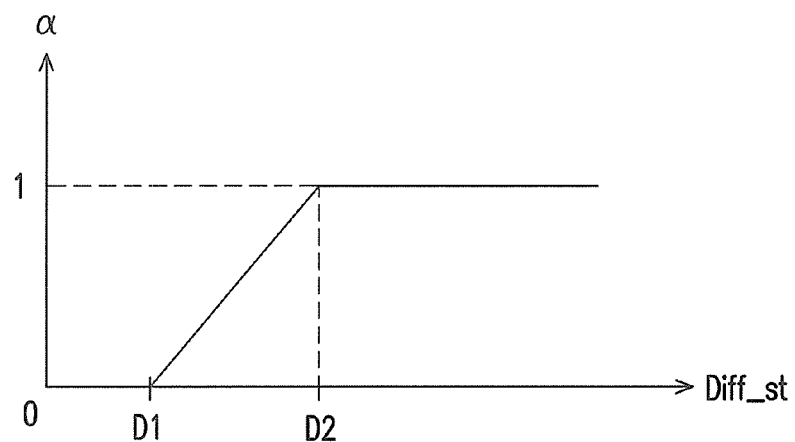
FIG. 3 illustrates relationship between a determination value and a weight value that is output by the signal detecting unit depicted in FIG. 2.
FIG. 4 enumerates a gray scale value of each pixel in an image signal, an up-sampled image signal, and an adjusted image signal and a tolerance range of the gray scale value of each of the pixels.

FIG. 3 illustrates relationship between the determination value Diff_st and the weight value α that is output by the signal detecting unit depicted in FIG. 2. With reference to FIG. 1 to FIG. 3, in this embodiment, if the determination value Diff_st is greater than a threshold value D2, the signal detecting unit 120 outputs the weight value α (=1) to the signal mixing unit 140. For instance, the overshoot interpolated pixel I3 is taken for example. When the determination value Diff_st>0, the signal detecting unit 120 outputs the weight value α (=1) to the signal mixing unit 140.

The signal mixing unit 140 mixes the second up-sampled image signal S2" and the adjusted first up-sampled image signal S2' at a 1:0 ratio, which indicates that the signal mixing unit 140 defines the second up-sampled image signal S2" as a to-be-output image signal S3 and then outputs the image signal S3 to the following image processing circuit.

On the contrary, if the determination value Diff_st is less than a threshold value D1, the signal detecting unit 120 outputs the weight value α (=0) to the signal mixing unit 140. For instance, the transition interpolated pixel I4 is taken for example. When the determination value Diff_st=0, the signal detecting unit 120 outputs the weight value α (=0) to the signal mixing unit 140. The signal mixing unit 140 mixes the second up-sampled image signal S2" and the adjusted first up-sampled image signal S2' at a 0:1 ratio, which indicates that the signal mixing unit 140 defines the adjusted first up-sampled image signal S2' as a to-be-output image signal S3 and then outputs the image signal S3 to the following image processing circuit.

Moreover, if the determination value Diff_st is determined to be between the threshold values D1 and D2, the signal detecting unit 120 outputs the weight value α to the signal mixing unit 140 based on the curve diagram depicted in FIG. 3. Namely, the signal mixing unit 140 mixes the second up-sampled image signal S2" and the adjusted first up-sampled image signal S2' based on the relationship depicted in FIG. 3 and the equation S3=S2'×(1−α)+S2"×(α), so as to obtain the mixed image signal S3.

Note that the relationship between the weight value α and the determination value Diff_st depicted in FIG. 3 is merely exemplary, and the curve diagram showing the aforesaid relationship can be adaptively adjusted based on requirements for circuit design, which should not be construed as a limitation to this invention.

In this embodiment, the signal detecting unit 120, after detecting the up-sampled image signal S2, not only outputs the weight value α to the signal mixing unit 140 based on the detection result but also outputs the detected image signal S2 to the signal correcting unit 130, such that the signal correcting unit 130 determines to adjust or not to adjust the values of the interpolated pixels based on the detection result of the signal detecting unit 130.

The gray scale values of the pixels are taken for example. FIG. 4 enumerates the gray scale value of each pixel in the image signal S1, the first up-sampled image signal S2, and the adjusted first up-sampled image signal S2' and a tolerance range of the gray scale value of each of the pixels.

Please refer to FIG. 1 and FIG. 4. In FIG. 4, the gray scale values of the original pixels P2~P4 in the image signal are 50 before and after the image signal is up-sampled, and the gray scale values of the original pixels P5~P7 in the image signal are 200 before and after the image signal is up-sampled, for instance. The gray scale values of the interpolated pixels I2~I6 in the up-sampled image signal are respectively 70, 0, 125, 250, and 180, for example.

In this embodiment, when the interpolated pixels are determined to be the artifact pixels or the overshoot pixels, the signal correcting unit 130 limits the gray scale values of the interpolated pixels to be within a tolerance range based on the detection result of the signal detecting unit 120. The tolerance range of the gray scale values includes an upper limit and a lower limit.

Here, the signal correcting unit 130, for example, determines the upper limit and the lower limit of the tolerance range based on the gray scale values of two original pixels adjacent to one interpolated pixel. Alternatively, the signal correcting unit 130, for example, determines the upper limit and the lower limit of the tolerance range based on two original pixels. Here, the two original pixels are located at the right and the left of one interpolated pixel, and there is another original pixel respectively located between the interpolated pixel and the two original pixels.

The interpolated pixel I2 is taken for example. The signal detecting unit 120 determines the interpolated pixel I2 to be an artifact pixel, and the gray scale value of the interpolated pixel I2 is 10 before being limited. The signal correcting unit 130 then determines the standard upper limit of the tolerance range to be 50 based on the gray scale value (=50) of the original pixel P3, and the upper limit of the tolerance range is the sum of the standard upper limit and a tolerance value (=10). Here, the interpolated pixel I2 has the upper limit (=60) of the tolerance range. Hence, the signal correcting unit 130 limits the upper limit of the gray scale value of the interpolated pixel I2 to be 60, and the gray value of the interpolated pixel I2 is adjusted from 70 to 60.

Besides, the signal correcting unit 130 further determines the standard lower limit of the tolerance range based on the gray scale value (=50) of the original pixel P2, and the lower limit of the tolerance range is the difference between the standard lower limit and the tolerance value (=10).

In other words, when the interpolated pixel I2 is determined to be the artifact pixel, the signal correcting unit 130 respectively determines the upper limit and the lower limit of the tolerance range to be 60 and 40 based on the gray scale values of the two original pixels P3 and P2 adjacent to the interpolated pixel I2.

The interpolated pixel I3 is also taken for example. The signal detecting unit 120 determines the interpolated pixel I3 to be an overshoot pixel, and the gray scale value of the interpolated pixel I3 is 0 before being limited. The signal correcting unit 130 then determines the standard upper limit of the tolerance range to be 200 based on the gray scale value (=200) of the original pixel P5, and the upper limit (=210) of the tolerance range is the sum of the standard upper limit and the tolerance value (=10).

Besides, the signal correcting unit 130 further determines the standard lower limit (=50) of the tolerance range based on the gray scale value (=50) of the original pixel P2, and the lower limit of the tolerance range is the difference between the standard lower limit and the tolerance value (=10). Here, the interpolated pixel I3 has the lower limit (=40) of the tolerance range. Hence, the signal correcting unit 130 limits the lower limit of the gray scale value of the interpolated pixel I3 to be 40, and the gray value of the interpolated pixel I3 is adjusted from 0 to 40.

In other words, when the interpolated pixel I3 is determined to be the overshoot pixel, the signal correcting unit 130 respectively determines the upper limit and the lower limit of the tolerance range to be 210 and 40 based on the gray scale values of the two original pixels P5 and P2 around the interpolated pixel I3. Here, there is another original pixel respectively located between the interpolated pixel I3 and the original pixels P2 and P5.

In this embodiment, the tolerance value (=10) is merely exemplary, while the tolerance value can be adaptively adjusted based on requirements for circuit design, which should not be construed as a limitation to this invention. Additionally, the pixel value of this embodiment refers to the gray scale value of the pixel, for instance, while the pixel value of other embodiments of the invention can also be a color value or a luminance value of the image signal.

In this embodiment of the invention, the image adjusting circuit is applicable to effectively detect locations of light contour and ripples with low costs when the image signal is up-sampled by two, and the up-sampling result is further limited, such that the interpolated pixel is restricted to be around the adjacent original pixels, which should however not be construed as a limitation to the invention. Thereby, the quality of the output image can be improved. In other embodiments of the invention, if the image signal is not up-sampled by two, it is likely to first up-sample the image signal by $2^n$ (n is a positive integer other than one) and then reduce the up-sampled signal to a predetermined degree.

Figure 5:
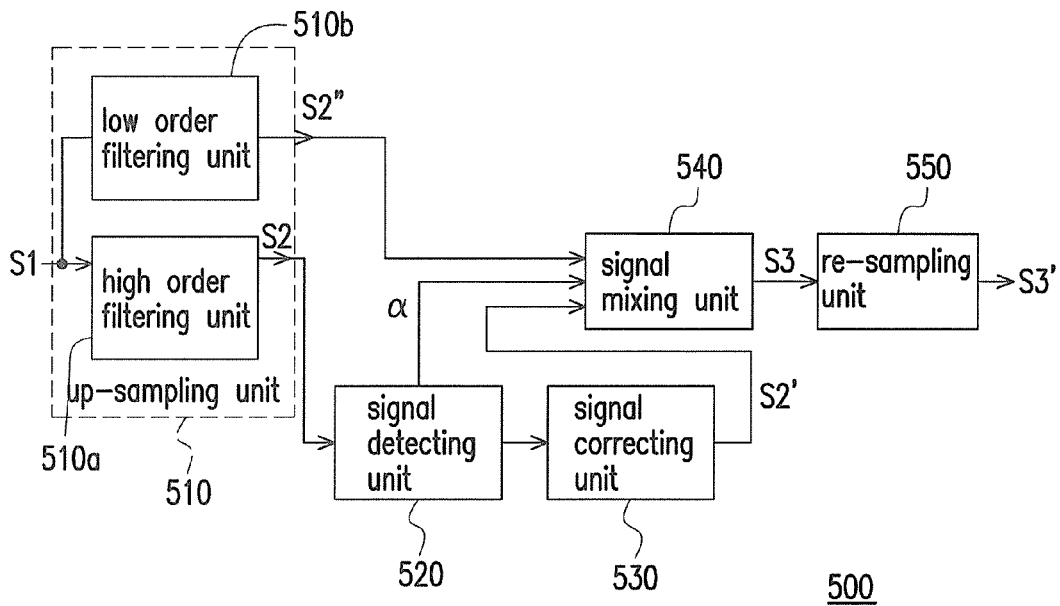
FIG. 5 illustrates an image adjusting circuit according to another embodiment of the invention.

FIG. 5 illustrates an image adjusting circuit according to another embodiment of the invention. As indicated in FIG. 1 and FIG. 5, the main difference between the image adjusting circuit 500 of this embodiment and the image adjusting circuit 100 depicted in FIG. 1 exemplarily lies in that the image adjusting circuit 500 further includes a re-sampling unit 550 for re-sampling the mixed image signal S3, such that the image corresponding to the image signal S1 can be multiplied to a predetermined degree.

Namely, if the image signal is not up-sampled by two, it is likely for the image adjusting circuit 500 to first up-sample the image signal by $2^n$ (n is a positive integer other than one) and then reduce the up-sampled signal to a predetermined degree by means of the re-sampling unit 550.

On the other hand, identical or similar features of the image adjusting circuits 500 and 100 can be sufficiently taught, suggested, and embodied in the descriptions with reference to FIG. 1~FIG. 4, and therefore no further description is provided herein.

Figure 6:
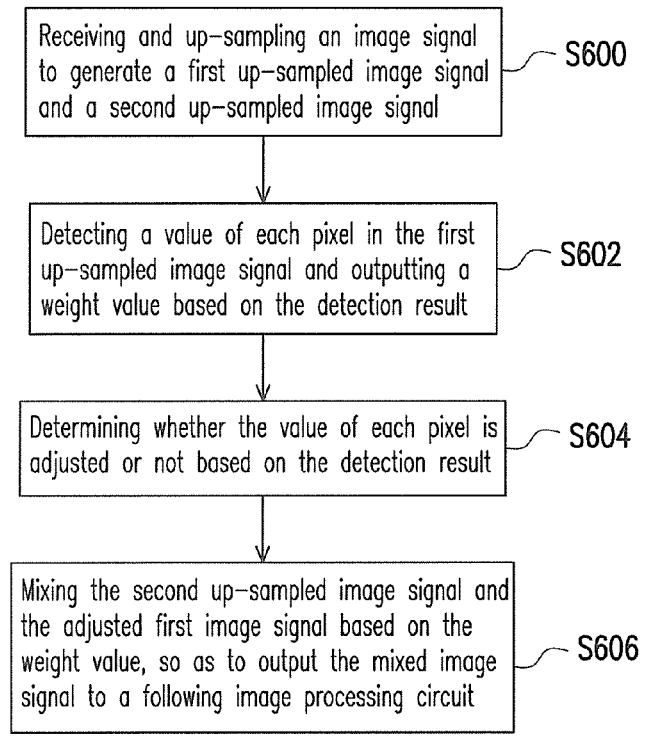
FIG. 6 is a flowchart illustrating an image adjusting method according to an embodiment of the invention.

FIG. 6 is a flowchart illustrating an image adjusting method according to an embodiment of the invention. With reference to FIG. 1 and FIG. 6, the image adjusting method of this embodiment includes following steps.

In step S600, an image signal S1 is received by an up-sampling unit 110, and the image signal S1 is up-sampled to generate a first up-sampled image signal S2 and a second up-sampled image signal S2". The first up-sampled image signal S2 includes at least one interpolated pixel and at least one original pixel. In step S602, the signal detecting unit 120 detects a value of each pixel in the first up-sampled image signal S2, and a weight value α is output to a signal mixing unit 140 based on the detection result. In step S604, the signal correcting unit 130 determines whether the value of the interpolated pixel is adjusted or not based on the detection result of the signal detecting unit 120. In step S606, the signal mixing unit 140 mixes the second up-sampled image signal S2" and an adjusted first up-sampled image signal S2' based on the weight value α, so as to output the mixed image signal S3 to a following image processing circuit.

In this embodiment, the image corresponding to the up-sampled image signal S2 is doubled in step S600 after the up-sampling unit 110 up-samples the image signal S1.

In another embodiment of the invention, the image adjusting method further includes re-sampling the up-sampled image signal to multiply an image corresponding to the image signal to a predetermined degree.

On the other hand, the image adjusting method described in this embodiment of the invention is sufficiently taught, suggested, and embodied in the embodiments illustrated in FIG. 1A-FIG. 5, and therefore no further description is provided herein.

Based on the above, in the image adjusting circuit and the image adjusting method, the pixels of the up-sampled image signal can be detected, and the interpolated pixel exceeding the tolerance range can be limited and adjusted based on the detection result of the signal detecting unit, so as to remove the light contour generated at the sharp edges of an image when the image is being up-sampled and eliminate the ripples caused by the ringing effects or the ripple effects.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An image adjusting circuit comprising:
   an up-sampling unit receiving and up-sampling an image signal to generate a first up-sampled image signal and a second up-sampled image signal, the first up-sampled image signal comprising at least one interpolated pixel and at least one original pixel;
   a signal detecting unit detecting a value of the at least one interpolated pixel and a value of the at least one original pixel and outputting a weight value based on a detection result of the signal detecting unit;
   a signal correcting unit determining whether the value of the at least one interpolated pixel is adjusted or not based on the detection result of the signal detecting unit; and
   a signal mixing unit mixing the second up-sampled image signal and the adjusted first up-sampled image signal based on the weight value to output a mixed image signal.

2. The image adjusting circuit as claimed in claim 1, wherein the signal correcting unit limits the value of the at least one interpolated pixel to be within a tolerance range based on the detection result of the signal detecting unit, and the tolerance range includes an upper limit and a lower limit.

3. The image adjusting circuit as claimed in claim 2, wherein the first up-sampled image signal comprises a first original pixel and a second original pixel, and the signal correcting unit respectively determines the upper limit and the lower limit of the tolerance range based on a value of the first original pixel and a value of the second original pixel.

4. The image adjusting circuit as claimed in claim 3, wherein the signal correcting unit determines a standard upper limit based on the value of the first original pixel and determines a standard lower limit based on the value of the second original pixel, the upper limit of the tolerance range is the sum of the standard upper limit and a tolerance value, and the lower limit of the tolerance range is the difference between the standard lower limit and the tolerance value.

5. The image adjusting circuit as claimed in claim 2, wherein the signal correcting unit limits the value of the at least one interpolated pixel to be within the tolerance range based on the detection result of the signal detecting unit if the at least one interpolated pixel is an overshoot pixel.

6. The image adjusting circuit as claimed in claim 2, wherein the signal correcting unit limits the value of the at least one interpolated pixel to be within the tolerance range based on the detection result of the signal detecting unit if the at least one interpolated pixel is an artifact pixel.

7. The image adjusting circuit as claimed in claim 1, wherein the signal correcting unit, based on the detection result of the signal detecting unit, does not adjust the value of the at least one interpolated pixel if the at least one interpolated pixel is a transition pixel.

8. The image adjusting circuit as claimed in claim 1, wherein the up-sampling unit up-samples the image signal to double an image corresponding to the image signal.

9. The image adjusting circuit as claimed in claim 1, wherein the value of the at least one interpolated pixel and the value of the at least one original pixel are gray scale values, color values, or luminance values of the image signal.

10. The image adjusting circuit as claimed in claim 1, wherein the up-sampling unit comprises:
   a high order filtering unit receiving and up-sampling the image signal to generate the first up-sampled image signal; and
   a low order filtering unit receiving and up-sampling the image signal to generate the second up-sampled image signal.

11. An image adjusting method adapted to an image adjusting circuit and comprising:
   receiving and up-sampling an image signal to generate a first up-sampled image signal and a second up-sampled image signal, wherein the first up-sampled image signal comprises at least one interpolated pixel and at least one original pixel;
   detecting a value of the at least one interpolated pixel and a value of the at least one original pixel and outputting a weight value based on a detection result;
   determining whether the value of the at least one interpolated pixel is adjusted or not based on the detection result; and
   mixing the second up-sampled image signal and the adjusted first up-sampled image signal based on the weight value to output a mixed image signal.

12. The image adjusting method as claimed in claim 11, wherein the step of adjusting the value of the at least one interpolated pixel comprises limiting the value of the at least one interpolated pixel to be within a tolerance range based on the detection result, and the tolerance range comprises an upper limit and a lower limit.

13. The image adjusting method as claimed in claim 12, wherein the first up-sampled image signal comprises a first original pixel and a second original pixel, and the step of adjusting the value of the at least one interpolated pixel comprises respectively determining the upper limit and the lower limit of the tolerance range based on a value of the first original pixel and a value of the second original pixel.

14. The image adjusting method as claimed in claim 13, wherein the step of determining the upper limit and the lower limit of the tolerance range comprises determining a standard upper limit based on the value of the first original pixel and determining a standard lower limit based on the value of the second original pixel, the upper limit of the tolerance range is the sum of the standard upper limit and a tolerance value, and the lower limit of the tolerance range is the difference between the standard lower limit and the tolerance value.

15. The image adjusting method as claimed in claim 12, wherein the step of adjusting the value of the at least one interpolated pixel comprises limiting the value of the at least one interpolated pixel to be within the tolerance range based on the detection result if the at least one interpolated pixel is an overshoot pixel.

16. The image adjusting method as claimed in claim 12, wherein the step of adjusting the value of the at least one interpolated pixel comprises limiting the value of the at least one interpolated pixel to be within the tolerance range based on the detection result if the at least one interpolated pixel is an artifact pixel.

17. The image adjusting method as claimed in claim 11, wherein based on the detection result, the value of the at least one interpolated pixel is not adjusted in the step of adjusting the value of the at least one interpolated pixel if the at least one interpolated pixel is a transition pixel.

18. The image adjusting method as claimed in claim 11, wherein the value of the at least one interpolated pixel and the value of the at least one original pixel are gray scale values, color values, or luminance values of the image signal.

* * * * *